United States Patent
Moritzen

Patent Number: 5,136,722
Date of Patent: Aug. 11, 1992

[54] PANTS FOR A PILOT

[75] Inventor: Werner Moritzen, Elmshorn, Fed. Rep. of Germany

[73] Assignee: Autoflug GmbH & Co., Fed. Rep. of Germany

[21] Appl. No.: 688,145

[22] Filed: Apr. 19, 1991

[30] Foreign Application Priority Data

Apr. 20, 1990 [DE] Fed. Rep. of Germany ....... 4012594

[51] Int. Cl.⁵ .................................................. A41D 13/00
[52] U.S. Cl. .................................................. 2/22; 2/227
[58] Field of Search ............... 2/2, 22, 69, 79, 227, 2/242, DIG. 3; 36/2 A, 2 B, 2 R

[56] References Cited

U.S. PATENT DOCUMENTS

| | | | |
|---|---|---|---|
| 1,641,487 | 9/1927 | Hockmeyer | 2/227 |
| 1,801,562 | 4/1931 | Luft | 2/227 |
| 2,959,168 | 11/1960 | Shook | 2/22 |
| 4,064,874 | 12/1977 | Valin | 2/22 |
| 4,266,298 | 5/1981 | Graziano | 2/22 |
| 4,370,754 | 2/1983 | Donzis | 2/2 |
| 4,382,301 | 5/1983 | Hightower | 2/22 |
| 4,503,566 | 3/1985 | Wheeler | 2/22 |
| 4,896,437 | 1/1990 | Johnson | 2/22 |
| 4,926,501 | 5/1990 | Goosen | 2/22 |
| 4,986,263 | 1/1991 | Dickerson | 2/22 |
| 5,033,126 | 7/1991 | Wruck | 2/227 |

FOREIGN PATENT DOCUMENTS

| | | | |
|---|---|---|---|
| 1256800 | 2/1961 | France | 2/227 |
| 2051556 | 1/1981 | United Kingdom | 2/79 |

*Primary Examiner*—Werner H. Schroeder
*Assistant Examiner*—Diana L. Biefeld
*Attorney, Agent, or Firm*—Robert W. Becker & Associates

[57] ABSTRACT

The stressing of zippers for closing leg portions of pilot's pants having integrated an inflatable bladder and having two leg portions that can be opened and closed by zippers extending in a longitudinal direction from the thigh area to the shin area is avoided by providing the leg portions with two individual zippers for the thigh area and the shin area, whereby the zippers are provided with sliding pieces that for a closing action are moved toward the foot section of the pilot's pants and whereby in the bending area of the knee of the wearer the individual zippers have between them an abutment zone.

7 Claims, 2 Drawing Sheets

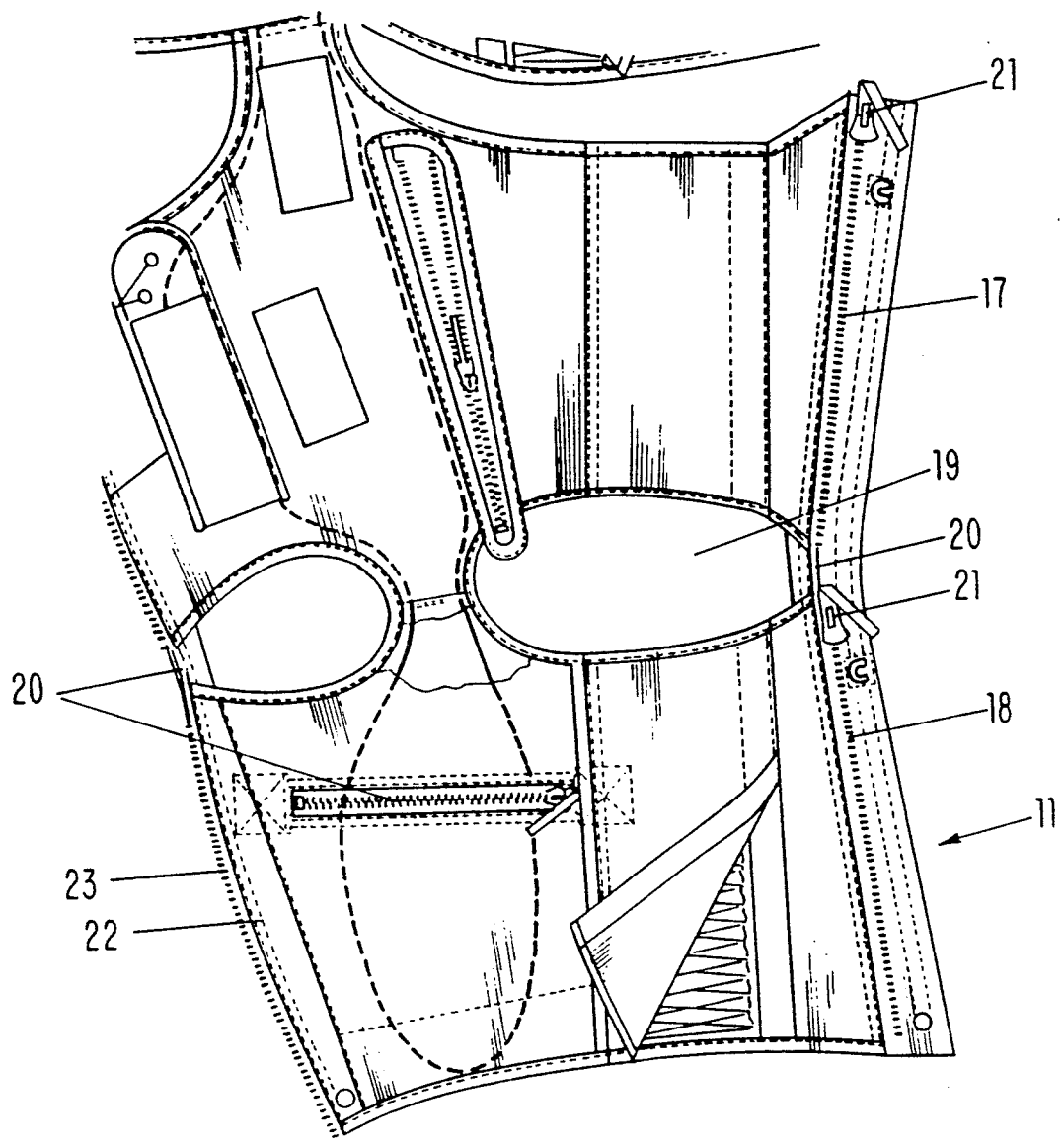
FIG-2
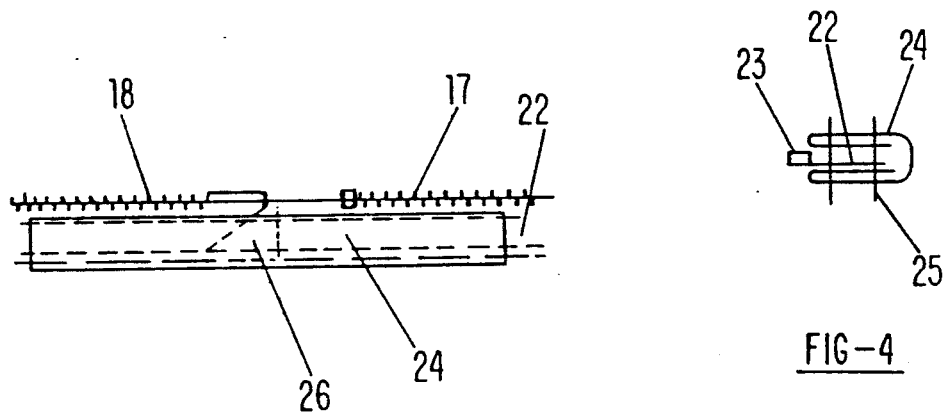
FIG-3
FIG-4

PANTS FOR A PILOT

BACKGROUND OF THE INVENTION

The present invention relates to pilot's pants having integrated therein an inflatable bladder, with two leg portions that can be opened and closed by zippers.

Pilot's pants of the aforementioned kind are provided with an inflatable bladder which is connected via a hose connection to a pressurized air supply so that, in the case that the wearer of the pilot pants is exposed to high acceleration values as a pilot of an aircraft, resulting in a drainage of blood from the brain into the limbs, by inflating the bladder a counter pressure is established which exerts pressure onto the limbs. Since these pilot's pants are usually worn over regular clothing of the pilot the leg portions of such pilot's pants are usually provided with zippers with which the leg portions can be opened and closed so that during the dressing step the pilot's pants are placed around the legs and then, by zipping up the zippers, are brought into shape.

With known pilot's pants of the aforementioned kind a single continuous zipper is provided for closing the leg portions which extends over the t high area as well as the shin area, whereby the sliding piece for closing the zipper is slid from the top to the bottom towards the foot section. This closing direction of the sliding piece is a prerequisite for loading the sliding piece in the closing direction so that during high acceleration forces the zipper cannot slide open.

Such one-piece zippers have the disadvantage that in the knee area between the thigh and the shin the zippers are usually under constant bending stress due to the regular walking motion of the pilot. Due to this constant bending stress damages to the zippers may occur which during the stressing of the zipper during the inflation of the inner bladder of the pilot's pants may result in opening of the zipper since during the inflated state of the pilot's pants a considerable load is exerted onto the zippers of the leg portions. When the zippers give under the load of the inflated pilot pants an unpredictable pressure loss may occur within the pilot's pants which in return will cause a malfunction of the pants so that the blood drainage from the brain of the wearer that is to be prevented will occur.

It is therefore an object of the present invention to provide a pilot's pants of the aforementioned kind in which the unfavorable stress on the zippers is reduced.

BRIEF DESCRIPTION OF THE DRAWINGS

This object, and other objects and advantages of the present invention, will appear more clearly from the following specification in conjunction with the accompanying tables and drawings, in which:

FIG. 2 shows, in an enlarged representation, the knee area of a leg portion of the inventive pilot's pants:

FIG. 3 shows the abutment zone between the individual zippers in a schematic representation; and FIG. 4 shows a simplified cross section of the seam area of the zippers in the abutment zone.

SUMMARY OF THE INVENTION

Figure 1:
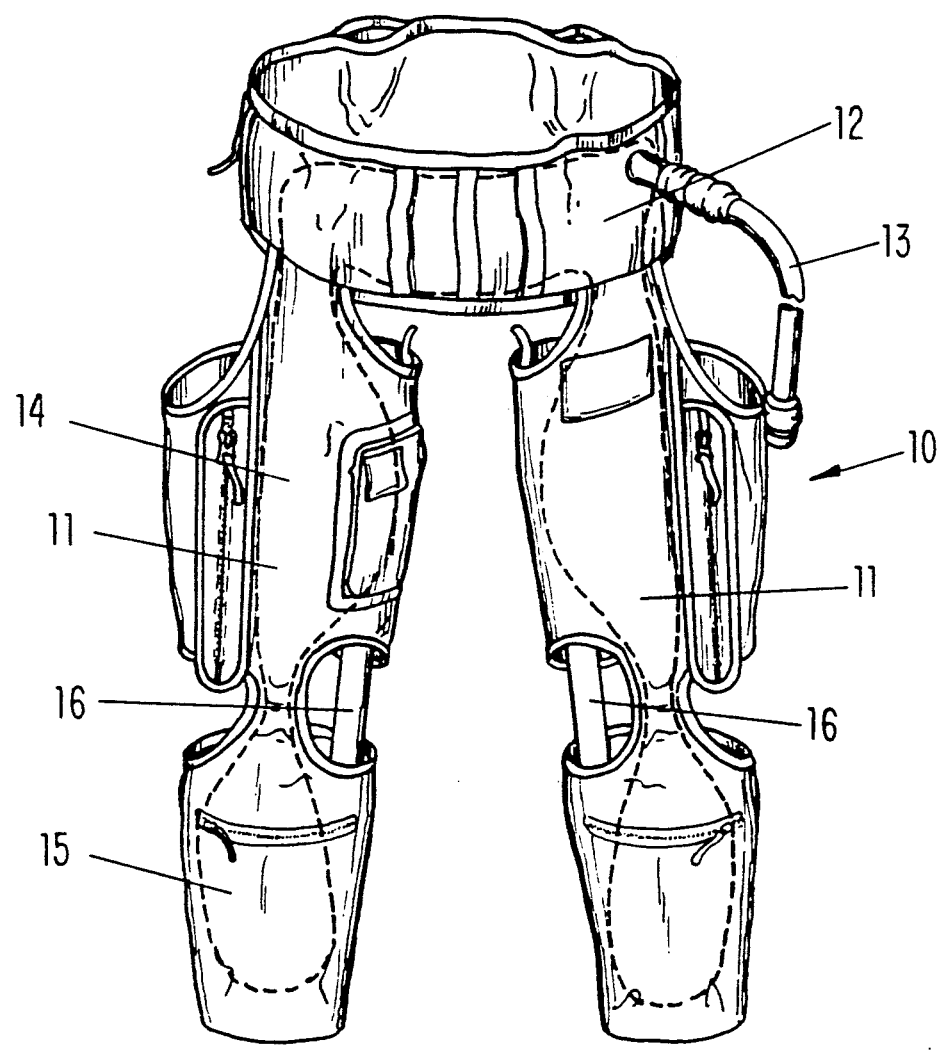
FIG. 1 is a perspective representation of a pilot's pants of the present invention.

The pilot's pants of the present invention are primarily characterized by the two leg portions being provided with a first zipper for the thigh area and a second zipper for the shin area whereby the zippers are arranged such that a respective sliding piece is moved downward for closing the zippers and with the first and the second zipper having between them an abutment zone in a knee bending area of the wearer.

According to the present invention two individual zippers for the thigh area and the shin area are provided for each leg portion whereby the highly stressed bending section in the knee area is bridged so that the individual zippers are not exposed to the changing load or stress during walking whereby the closing safety of the zippers is improved. Due to the arrangement of two individual zippers the requirement that the sliding pieces of both zippers, during the closing movement, are to be moved from the top to the bottom, i.e., from the hip area to the foot area of the pants, is easily fulfilled.

In a preferred embodiment of the present invention the abutment zone between the two zippers is reinforced by a reinforcement strip which is bridging the distance between the two zippers whereby the reinforcement strip is sewn to the protruding ends of the zipper tapes of the two zippers as well as the leg portion. The reinforcement strip is preferably bent lengthwise in a U-shaped manner and receives the respective ends of the zipper tapes of the two zippers between the legs of the U-shaped arrangement and is then sewn to the ends of the zipper tapes of the zippers and to the leg portion. In a preferable embodiment the reinforcement strip is doubled so that a four fold reinforcement of the abutment zone is achieved. The fabric warp of the reinforcement strip is preferably arranged parallel to a pulling direction of the zippers.

In order to facilitate the threading of the sliding piece into the upper connecting portion of the zipper of the shin area that is arranged in the knee area, the end of the zipper tape of the zipper for the thigh area is slanted such that the teeth of the lower zipper are showing. Thereby, during the insertion and the movement of the sliding piece into the connecting portion of the zipper for the shin area only the end of the respective zipper tape is engaged. To achieve this, the protruding end of the zipper tape of the upper zipper is folded under and covered by the reinforcement strip. Thus, it is avoided that the respective movement of the sliding part engages portions of the zipper tape of the upper zipper in the thigh area respectively of the reinforcement strip, so that loose fibers or rubbed off particles cannot reach the connecting portion of the zipper in the shin area.

It is also possible to provide the teeth for the individual zippers for the thigh area and the shin area on one continuous zipper tape that is to be sewn to the leg portion, whereby in the knee area a gap free of teeth is provided and respective means for the threading of the sliding piece for the zipper in the shin area respectively a stop for the sliding piece of the zipper in the thigh area are provided.

DESCRIPTION OF PREFERRED EMBODIMENTS

The present invention will now be described in detail with the aid of several specific embodiments utilizing FIGS. 1 through 4.

The pilot's pants 10 are provided with two leg portions 11 and a hip section 12 in which a connection 13 to a pressurized air system is provided. The pressurized air system supplies pressurized air to a non-represented bladder that is integrated into the pilot's pants 10. The leg portions 11 may be opened and closed lengthwise via respective zippers, that are arranged in a longitudinal direction at the thigh area 14 and the shin area 15. In the representation of FIG. 1 the zippers are arranged under covering strips 16.

In FIG. 2 the arrangement of two individual zippers namely a zipper 17 for the thigh area 14 and a zipper 18 for the shin area 15 is shown. FIG. 2 shows a leg portion 11 and its knee section in an unfolded representation, that is, the pants are not in a wearing condition. It can be seen that in the knee section expansion areas 19 are provided within the leg portion 11.

In the stressed knee section the zippers 17, 18 are arranged such that they do not abut directly but have an abutment zone 20 between them which bridges the distance between the threading end of the zipper 18 of the shin area and the stop of the zipper 17 of the thigh area. As can be seen from the drawing in detail the respective sliding pieces 21 of the zippers 17, 18 are arranged at the respective ends of the zippers 17, 18 that are facing away from the foot section of the pants so that for the closing action of the zippers the sliding pieces must be moved towards the food section. FIG. 2 also shows the zipper tapes 22 of the zippers 17, 18 being the carrier of the teeth 23.

As can be seen from FIG. 3, the bridging of the abutment zone 20 as well as a reinforcement of the abutment zone is achieved by a reinforcement strip 24 which engages the two ends of the zipper tapes 22 of the two individual zippers 17, 18. The fashion in which the sewing is achieved can be seen in detail in FIG. 4. The reinforcement strip 24 is doubled and is bent lengthwise in a U-shaped manner whereby the respective zipper tape 22 of the zippers 17, 18 are received between the legs of the U-shaped arrangement. The sewing is performed such that the seams 25 penetrate the reinforcement strip. In order to prevent the introduction of textile particles during the threading of the sliding piece 21 of the zipper 18 of the shin area into the teeth 23, the respective end of the zipper tape 22 of the upper zipper 17 is provided with a slanted portion 26.

The present invention is, of course, in no way restricted to the specific disclosure of the specification and drawings, but also encompasses any modifications within the scope of the appended claims.

What I claim is:

1. Pilot's pants having integrated therein an inflatable bladder said pilot's pants comprising two leg portions that can be opened and closed by zippers whereby each one of said two leg portions is provided with a first one of said zippers for a thigh area of the wearer and a second one of said zippers for a shin area of the wearer, with said zippers being arranged such that a respective sliding piece thereof is moved in a downward direction for closing said zippers, and with said first and said second zippers having between them an abutment zone in a knee bending area of the wearer.

2. Pilot's pants according to claim 1, in which, for reinforcing said abutment zone, a textile reinforcement strip bridges the distance between said first and said second zipper and is sewn to respective protruding ends of respective zipper tapes of said first and second zippers and said respective leg portion.

3. Pilot's pants according to claim 2, in which said reinforcement strip is bent lengthwise in a U-shaped manner, with said respective ends of said zipper tapes being received between legs of said U-shaped reinforcement strip, and with said reinforcement strip being sewn to said leg portion with a seam in a longitudinal direction of said leg portions.

4. Pilot's pants according to claim 3, in which said reinforcement strip is provided in a doubled fashion so that a four-fold reinforcement of said seam for said zipper tapes is achieved.

5. Pilot's pants according to claim 2, in which a fabric warp of said reinforcement strip is arranged parallel to a pulling direction of said zippers.

6. Pilot's pants according to claim 2, in which an end of said zipper tape of said first zipper, said end facing said second zipper, is slanted such that teeth of said second zipper are not covered.

7. Pilot's pants according to claim 1, in which teeth of said first and second zipper are disposed on a continuous zipper tape such that a gap remains in said abutment zone, whereby ends of said abutment zone, in a longitudinal direction of said zippers, are provided with a respective stop for said first zipper and a respective connecting portion for said second zipper.

* * * * *